Jan. 11, 1944.   F. ULRICH   2,338,884
APPARATUS FOR MAKING SLIDE FASTENERS
Filed Nov. 1, 1940   5 Sheets-Sheet 2

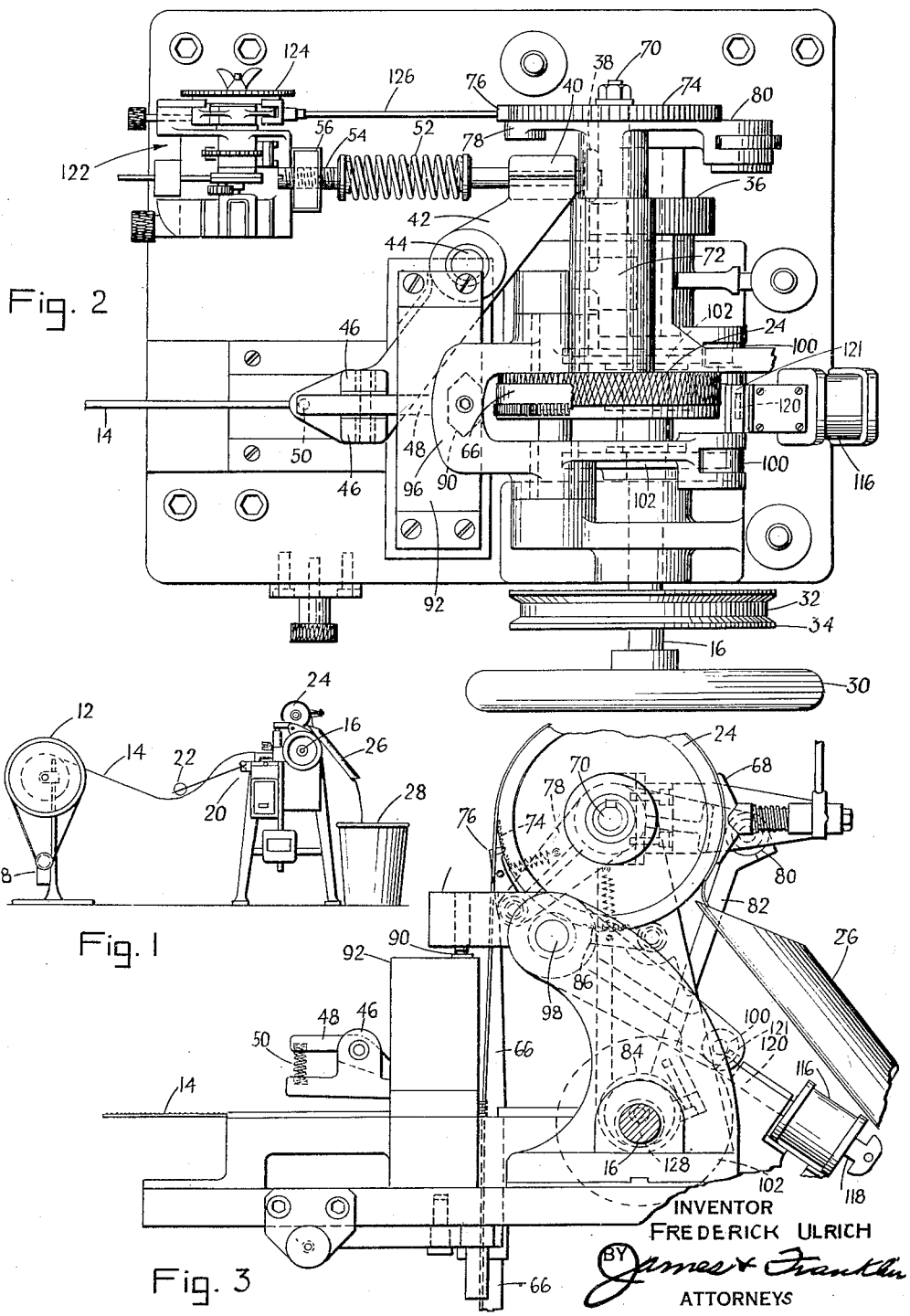

INVENTOR
FREDERICK ULRICH
BY James & Franklin
ATTORNEYS

Jan. 11, 1944. F. ULRICH 2,338,884
APPARATUS FOR MAKING SLIDE FASTENERS
Filed Nov. 1, 1940 5 Sheets-Sheet 3

INVENTOR
FREDERICK ULRICH
BY James H. Franklin
ATTORNEYS

Jan. 11, 1944.   F. ULRICH   2,338,884
APPARATUS FOR MAKING SLIDE FASTENERS
Filed Nov. 1, 1940   5 Sheets-Sheet 4

INVENTOR
FREDERICK ULRICH
BY *James T. Franklin*
ATTORNEYS

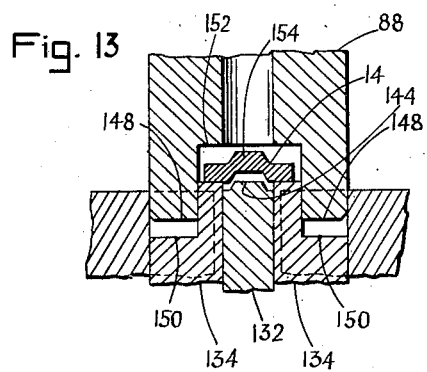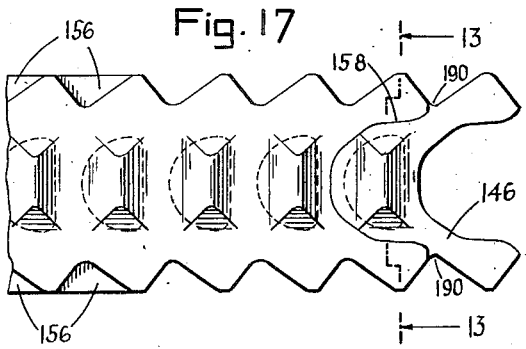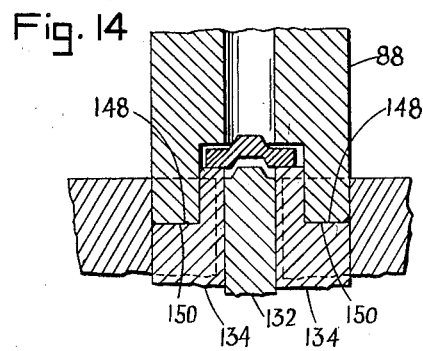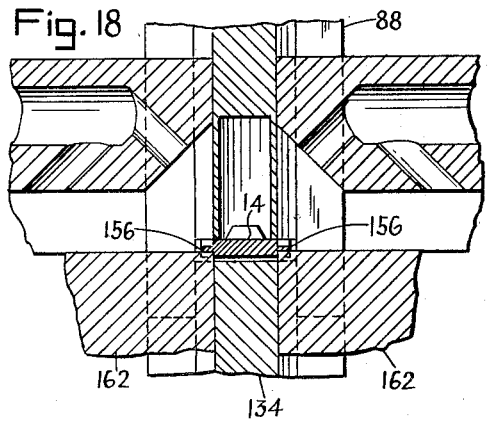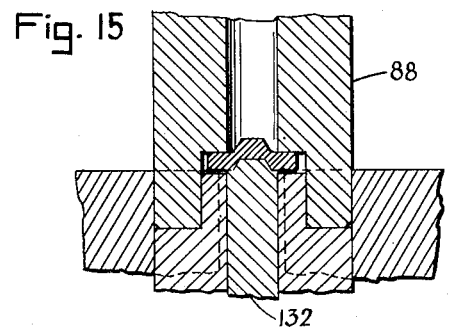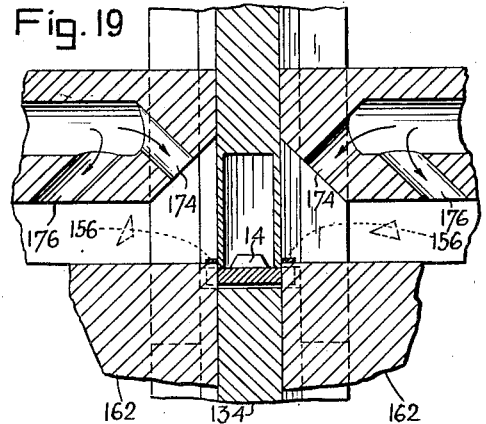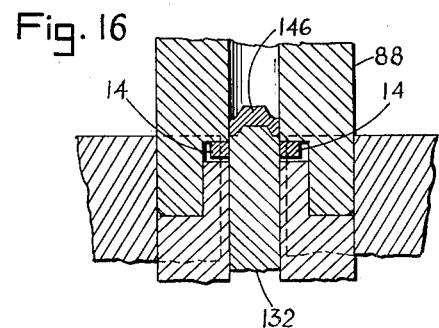

Patented Jan. 11, 1944

2,338,884

UNITED STATES PATENT OFFICE 2,338,884

APPARATUS FOR MAKING SLIDE FASTENERS

Frederick Ulrich, Bayonne, N. J., assignor to Conmar Products Corporation, Bayonne, N. J., a corporation of New Jersey Application November 1, 1940, Serial No. 363,804

10 Claims. (Cl. 153—1)

This invention relates to apparatus for making slide fasteners, and more particularly to a machine for severing embryo slide fastener elements and attaching the same to a tape.

The primary object of my invention is to provide apparatus of the aforesaid character, and more particularly improved apparatus for practicing the method disclosed in my co-pending applications Serial No. 179,299, filed December 11, 1937, and Serial No. 264,550, filed March 28, 1939, of which applications the present application is a continuation-in-part.

One more specific object of the present invention is to provide pilot means for exact location of the fastener element being severed, in order to improve the accuracy of said element.

Other objects center about the feed mechanism for feeding the fastener wire to the severing punch and are to redesign and lighten the feed arm for high-speed operation; and to so mount the dog that it may be moved upwardly when the spring pad of the die raises the wire, yet is stopped from moving downwardly during retraction of the dog, and is stopped before the element being severed comes into engagement with the aforesaid pilot, thereby freeing the fastener wire for proper seating or self-adjustment of the said element on the pilot.

In accordance with my invention as disclosed in the aforesaid application Serial No. 179,299, filed December 11, 1937, the fastener wire is provided with serrated edges in order that the finished elements may be formed with parallel sides and perpendicular ends for best cooperation with the slider. When making slide fastener wire by a rolling process, the wire will ordinarily come out with a thin residue or fin at the serrated edges. This fin may be removed by the punch and die mechanism of the attaching apparatus but, in such case, the use of an air blast is desirable in order to help insure removal of the tiny bits of scrap or fin cut from the wire. A further object of the present invention is to improve the air nozzle arrangement for discharging the scrap, and in accordance with my invention, while a part of the air stream may be directed into the punch and die, a larger portion of the air stream is diverted to flow outwardly into the scrap discharge path, thus helping draw the bits of scrap away from the punch and die.

To the accomplishment of the foregoing and such other objects as may hereinafter appear, my invention consists in the apparatus elements and their relation one to the other as hereinafter are more particularly described in the specification and sought to be defined in the claims. The specification is accompanied by drawings, in which:

Fig. 1 is a side elevation of apparatus embodying features of my invention;

Fig. 2 is a plan view of the head of the machine;

Fig. 3 is a side elevation of the head of the machine;

Fig. 13 is a transverse section taken through the die at the pilot, approximately in the plane of the line 13—13 of Figs. 6 and 17, with the punch and spring pad in raised or feeding position;

Fig. 14 is a similar view showing the punch lowered until its heels meet the spring pad in such manner as to prevent binding of the wire as the wire approaches the pilot;

Fig. 15 is a similar view showing the punch lowered until it meets the wire preparatory to severing the same;

Fig. 16 is a similar view showing the punch in lowermost position;

Fig. 17 is a plan view of the end of the fastener wire drawn to enlarged scale;

Fig. 18 is a transverse elevational section similar to Fig. 10, but showing the punch lowered until the fin engages the die; and Fig. 19 shows the relation of the parts at the end of the fin-cutting operation.

Figure 4:
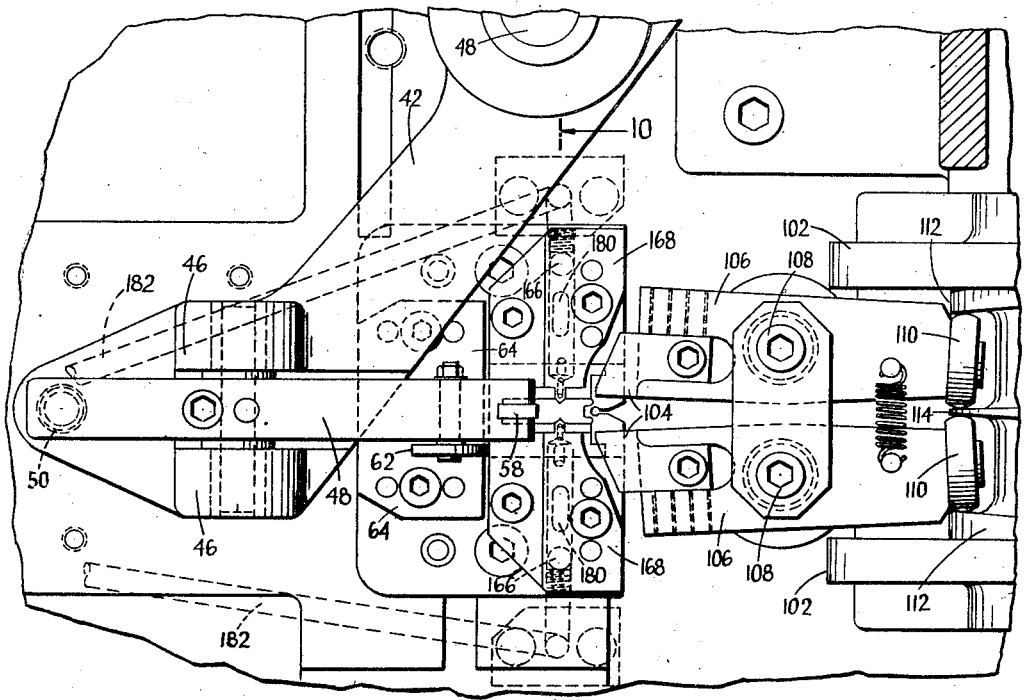
Fig. 4 is a plan view of a fragmentary portion of the machine, drawn to enlarged scale, with the ram and housing removed to expose the clamping jaws.

Referring to the drawings, and more particularly to Fig. 1, a reel 12 of slide fastener wire 14 is fed to attaching apparatus, the main drive and cam shaft of which is indicated at 16. Reel 12 may be unwound at intervals to provide a loop of slack between it and the attaching apparatus, as by means of an electric motor 18 controlled by a switch 20 moved by a feeler 22. The finished slide fastener stringer or so-called "chain" is fed over a feed wheel 24 through tube 26 into basket 28.

Referring now to Figs. 2 and 3, the main drive and cam shaft 16 is provided with a hand wheel, or/and fly wheel 30 and is driven by a suitable electric motor through belt 32 and pulley 34. The wire feed mechanism comprises a cylindrical cam 36 operating on a ball-bearing cam follower 38 mounted on the end 40 of a small compact feed arm 42 preferably made of Duralumin or equivalent light-weight metal. The Duralumin is preferably a heat treated material known commercially as 17 ST. The feed arm is pivoted at 44, and the movable end is provided with ears 46 pivotally carrying a feed dog 48 acted on by a compression spring 50. The cam follower is held in engagement with the cam by means of a compression spring 52, the tension of which may be adjusted by means of a screw 54 threadedly received in a stationary block 56.

Figure 5:
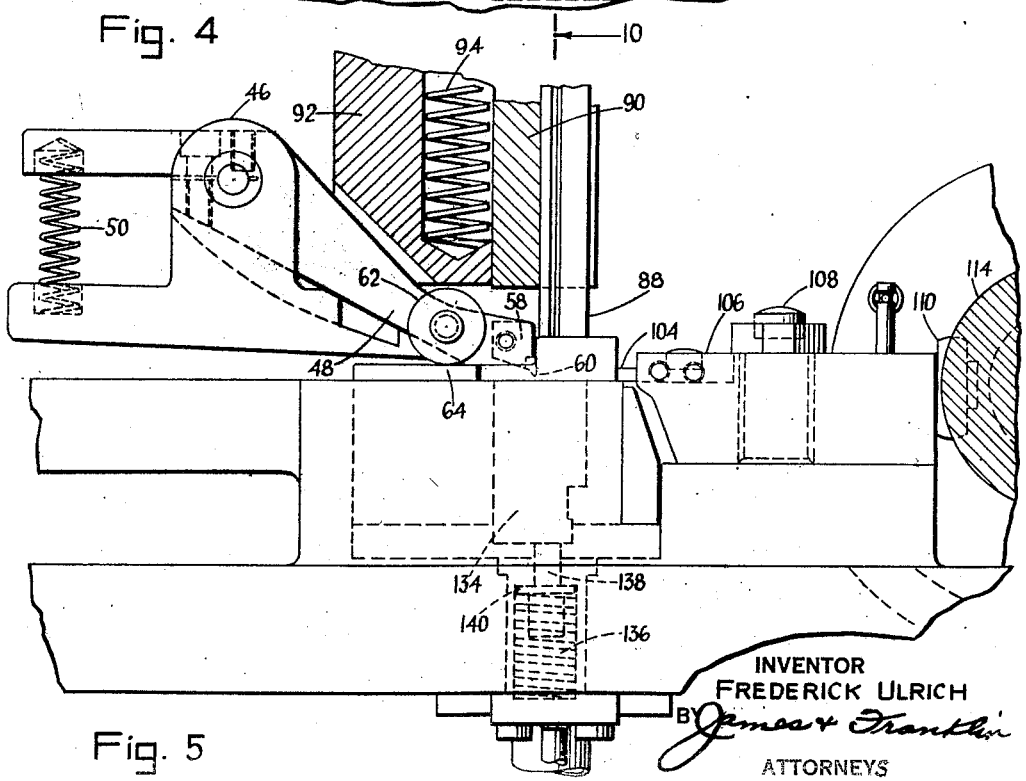
Fig. 5 is a partially sectioned elevation of the portion of the machine shown in Fig. 4.

Referring now to Figs. 4 and 5, the forward end of the feed dog carries an insert or tooth 58 having a suitably shaped hardened point 60. The feed dog 48 is arrested against downward movement at a desired point, for reasons later explained, and as here illustrated is provided with a suitable anti-friction roller 62 adapted to ride on the surface of part 64 of the die which part may, if desired, be provided with a hardened insert, not shown in the drawings. There are two parts 64 secured on top of the die, as is best shown in Fig. 4, and their combined function is to guide the wire 14. The parts 64 are omitted in Fig. 6.

The beaded edge tape on which the fastener elements are to be mounted is fed upwardly at the bottom of the machine as is indicated at 66 in Fig. 3. The tape is drawn upwardly through the die by means of a suitable knurled feed wheel 24 (Figs. 2 and 3), the tape being held against the wheel by means of a spring-pressed shoe 68. The feed wheel 24 is mounted at one end of a shaft 70 rotatably carried in a stationary bearing 72. The opposite end of shaft 70 carries a ratchet wheel 74. This is acted up by a tape feed pawl 76 carried at the lower end of an angle arm 78, the opposite end 80 of which is connected to the upper end of an eccentric rod 82, the split lower end of which is secured about an eccentric 84 mounted at one end of the drive shaft or cam shaft 16. The ratchet wheel 74 is further acted upon by a stationary holding pawl 86. It will be evident that the tape will be advanced intermittently or step by step as the cam shaft rotates.

The severing mechanism comprises a punch 88 (Fig. 5) carried in a ram 90 which is vertically reciprocable in a ram housing 92, the ram being normally urged upwardly by a compression spring 94, the upper end of which bears against a stud (not shown) projecting from ram 90 over the upper end of the spring. Referring now to Figs. 2 and 3 the upper end of ram 90 is acted on by a generally U-shaped rocker arm 96, the branches of which are pivoted at 98 and carry cam follower rollers 100 at their lower ends. The rocker arm is preferably made of Duralumin or similar light-weight metal in order to facilitate high-speed operation of the machine. The throw of the rocker arm, like the throw of the various other reciprocating parts of this machine, is minimized with the same object in view. Cam rollers 100 are acted on by radial cams 102 mounted on cam shaft 16. It will be evident that rotation of shaft 16 will cause oscillation of the rocker arm and consequent reciprocation of the ram and punch.

The jaws of the fastener elements are clamped on the tape by suitable clamping jaws, and referring to Figs. 4 and 5 the clamping jaws 104 are mounted on levers 106 pivoted at 108 and carrying cam rollers 110 at their opposite ends. Rollers 110 operate between cylindrical cams 112 and 114, thus providing positive movement in both directions. In Fig. 4 the clamping jaws are shown in their open position.

Figure 9:
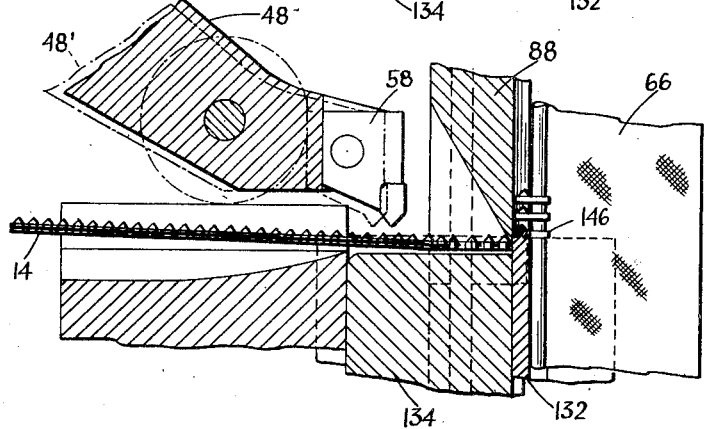
Fig. 9 is a similar view showing the relation of the parts as the punch finishes its severing stroke and the feed dog is retracted.

Referring to Fig. 9, gap spacing or the omission of fastener elements between stringer lengths may be accomplished by holding the punch 88 down, thereby holding the fastener wire 14 down as shown, so that the tooth 58 of the feed dog 48 reciprocates idly above the wire without feeding the same. Referring now to Figs. 2 and 3, the machine is provided with a solenoid 116 having a core 118 which is moved upwardly when the solenoid is energized and thereby moves a suitable stop 120 into the path of a bridge 121 connecting the bifurcated ends of the rocker arm. This stop is so located as to move beneath the bridge when the cam wheels of the rocker arm have been raised by the cams, and the stop thus serves to hold the punch in depressed position. This interrupts the feed of elements to the tape and produces the desired gap or spacing between fastener lengths. After a desired interval the solenoid is deenergized, whereupon the reciprocation of the punch and the feed of the wire are resumed.

The time and the length of the feed interruptions may be determined by a suitable counter 122 (Fig. 2) which includes a changeable ratchet wheel 124 acted on by a feed dog oscillated by link 126, the other end of which link is connected to a small crank pin 128 (Fig. 3) on the end of the cam shaft. The counter is provided with suitable contact mechanism controlling the electrical circuit of solenoid 116. The counter may, for example, be of the type disclosed in the Wintritz and Ulrich Patent No. 2,167,259, filed June 17, 1938.

Figure 6:
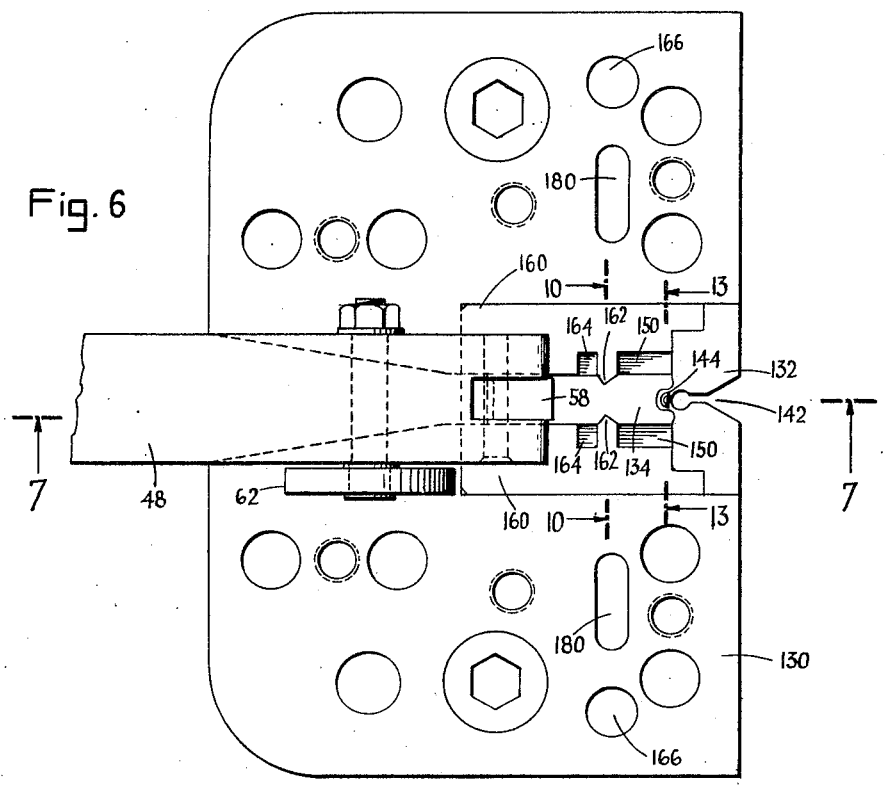
Fig. 6 is a plan view of the die and feed dog without the ram housing and air blast nozzles and wire guides.
Figure 7:
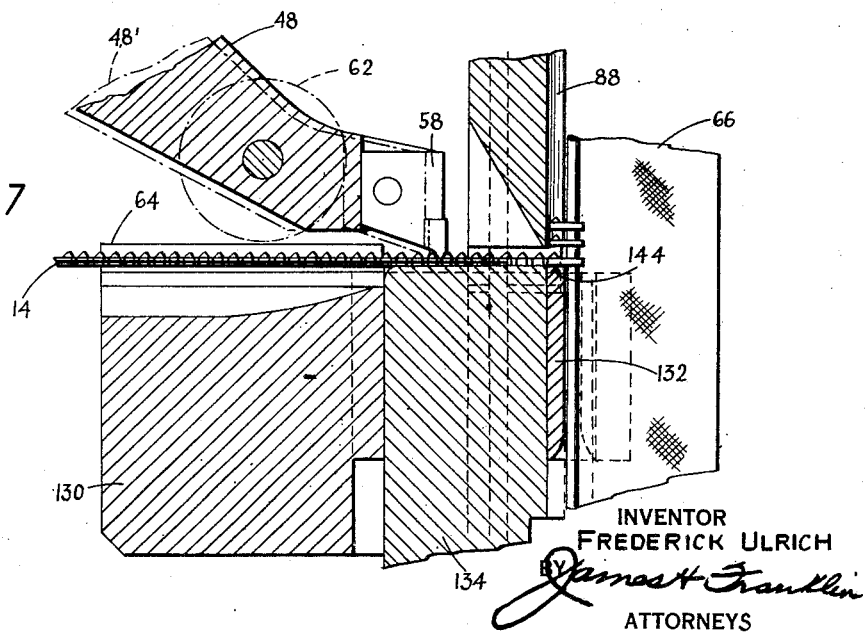
Fig. 7 is a section taken in elevation through the feed dog and punch, approximately in the plane of the line 7—7 of Fig. 6, and schematically illustrates the forward feed of the fastener wire.

Referring now to Figs. 6 and 7, the die holder 130 is fitted with a stationary die 132 and a vertically reciprocable spring pad 134. The spring pad 134 is elevated by a compression spring 136 (Fig. 5) disposed therebeneath, the said spring operating on a pusher 138 bearing against the pad 134. A collar or enlargement 140 on pusher 138 limits the upward movement of the spring pad to a desired amount.

Reverting to Figs. 6 and 7, the stationary die 132 is provided with a suitable guide slot 142 for the tape 66. It is further provided on its top surface with a pilot 144. Fig. 7 shows the parts in feed position, the punch 88 being raised to clear the projections on top of the fastener wire 14 and the spring pad 134 rising to its uppermost position, which is somewhat higher than the top of stationary die 132 and enough to cause the wire 14 to clear the top of the pilot 144, so that the pilot will not obstruct movement of the wire toward the tape 66. It will also be noted that with the wire in raised position, it is engaged by the feed tooth of dog 48 and, in fact, the dog is raised slightly so that wheel 62 leaves the stop surface 64. The wire is fed toward the right by the amount of the pitch between elements, and this is indicated by the change from the broken line position 48' to the solid line position 48 of the feed dog.

Figure 8:
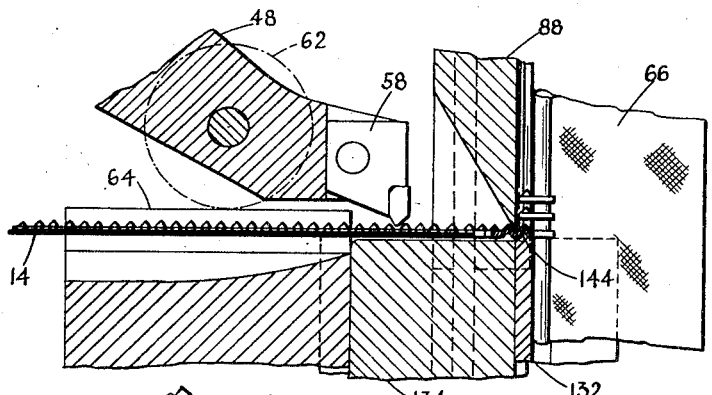
Fig. 8 is a similar view showing the relation of the parts as the punch brings the endmost element onto the pilot.

Fig. 8 represents a later stage in the operation of the machine with the punch 88 lowered until its heels engage and lower the spring pad 134. The cutting surface of the punch has engaged and lowered the wire 14 until the endmost element is seated and properly located by the pilot 144. At this time the anti-friction wheel 62 has already reached its stop surface 64, thereby arresting the dog tooth 58 from further downward movement. There is a clearance between the feed tooth and the wire, this being desirable to insure free movement of the wire under control of the pilot 144 as the pilot comes into control.

Figure 11:
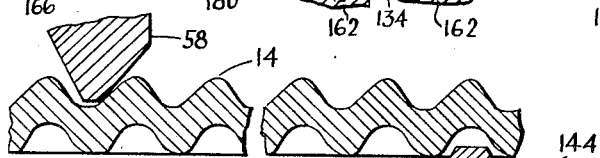
Fig. 11 is a fragmentary section taken in elevation through the feed dog and pilot as the wire reaches the pilot.
Figure 12:
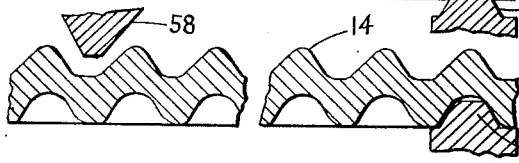
Fig. 12 is a similar view but showing the relation of the parts when the wire is seated on the pilot.

This point may be clarified by reference to Figs. 11 and 12 in which the parts are drawn to enlarged scale. In Fig. 11 the wire 14 is still under the control of feed tooth 58, but has been lowered far enough to begin to come into the control of pilot 144. Approximately at the point indicated by Fig. 11, however, further downward movement of the feed tooth is prevented, so that by the time the wire 14 is seated on pilot 144 there is a clearance between the wire and the feed tooth 58. Thus the wire can properly seat itself on pilot 144 even though it may have been overfed by the feed dog, thus necessitating a slight backward movement of the wire under influence of the pilot.

In Fig. 9 the punch 88 has descended to lowermost position and has shared the wire from the endmost element 146, the latter resting on and being supported by the stationary die 132. At this time the wire is wholly out of the path of the feed tooth and there is accordingly no obstruction to retraction of the feed dog from the solid line position 48 to the broken line position 48', preparatory to the next feed movement. The cycle of operation is completed by referring back to Fig. 7 in which punch 88 has been raised, thus permitting the pad 134 to raise the wire 14, so that it engages the feed tooth and clears the pilot. Movement of the feed dog from the broken line position 48' to the solid line position 48 moves the wire to bring the jaws at the end of the wire astride the beaded edge of tape 66.

The foregoing cycle of operation may also be described with reference to Figs. 13, 14, 15, and 16 which are taken approximately in the plane of the line 13—13 of Figs. 6 and 17. In Fig. 13 the punch 88 is in elevated position, its heels 148 being located above the mating parts 150 of spring pad 134. The spring pad is in raised position, thus causing the wire 14 to clear the pilot 144 of stationary die 132. The cutting surface 152 of punch 88 is disposed well above the projection 154 on wire 14.

In Fig. 14 the punch 88 has descended far enough to cause the heels 148 to engage the surfaces 150 of the spring pad 134. It will be noted that the heels of the punch are long enough to provide a clearance around the wire, this clearance being shown above the wire in Fig. 14 and below the wire in Fig. 15 but, in any case, guarding against binding of the wire between the punch on top of the wire and the spring pad beneath the wire, for this would inhibit proper self-adjustment and location of the wire on the pilot.

In Fig. 15 the punch 88 has descended far enough to bring the wire onto the stationary die 132. In Fig. 15 the punch is about to begin the shearing or severing operation. At this time the wire is bound between the punch and die but, of course, has already piloted itself on pilot 144. Fig. 15 corresponds substantially to Fig. 8, just as Fig. 13 corresponds to Fig. 7.

In Fig. 16 the punch 88 has moved to lowermost position and has sheared the wire 14 from the endmost element 146 resting on the die 132. This figure corresponds to the showing in Fig. 9.

The apparatus as so far described is adapted to operate on a wire having serrated edges and no fin. In practice, however, the wire is preferably formed by a rolling operation which leaves a thin fin of metal in the serrations, this fin being indicated at 156 in Fig. 17. The punch and die are accordingly further arranged to cut away the fin, thus leaving the endmost portion of the wire in serrated condition, preparatory to severance of the endmost element 146 on the shear line 158.

Referring to Fig. 6 the die holder 130 carries not only the stationary die portion 132 previously referred to, but two additional stationary die portions 160, these including the pointed parts 162 located between the punch heel receiving surfaces 150 and 164 of the spring pad 134. Thus the punch is provided with four heels, two being the heels 148 previously referred to which bear against the spring pad at 150, and the other two bearing against the spring pad at 164. The punch is cut away or channeled at its sides to fit around the stationary die portions 162.

Figure 10:
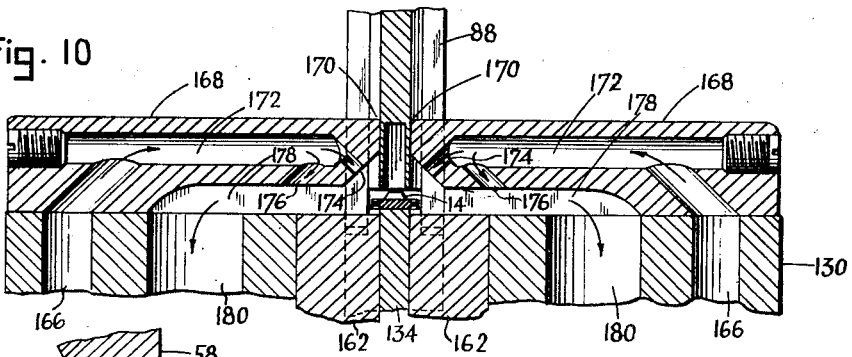
Fig. 10 is a transverse section through the punch and air nozzles, taken approximately in the plane of the line 10—10 of Fig. 4.

Figs. 10, 18, and 19 are taken approximately in the plane of the line 10—10 of Fig. 6. Referring to Fig. 10, the punch 88 is shown in raised position, it clearing the wire 14. The latter rests on spring pad 134 which at this point is narrow, it being cut away to slide between the stationary die portions 162. It will be noted that the fin on wire 14 overlies the stationary die portions 162.

Referring now to Fig. 18 the punch 88 has descended and its heels have lowered the spring pad 134, so that there is clearance beneath the wire 14. The wire has been carried down until the fins 156 rest on stationary die portions 162. This corresponds to the beginning of the fin-cutting operation. In Fig. 19 the punch has descended to lowermost position, thus shearing the wire 14 from the fins 156, the latter being restrained against downward movement by the stationary die portions 162.

This punch arrangement for cutting away the fin may also be used if necessary to cut through the full thickness of the wire or, in other words, to form the notches or serrations in the side edges of the wire. Thus the wire fed to the machine may have smooth edges with only the projections and recesses preformed therein. However, it is preferable to supply a wire with serrated edges as here illustrated.

Reverting to Figs. 6 and 10, compressed air is supplied through openings 166 in die holder 130. The air is thus led to nozzles 168 securd on top of the die with their ends 170 adjacent the punch 88 at the fin-cutting station. In Fig. 6 the nozzles have been removed, but they are shown at 168 in Fig. 4. The compressed air flows through passages 172 to relatively small discharge openings 174 which are directed against the sides of the punch and against the scrap or fin. A larger component of the compressed air is directed outwardly through openings 176 which lead into the scrap discharge channels 178. This helps carry the scrap along. It also tends to reduce pressure in channels 178, which is effective to draw the air from nozzles 174 outwardly, and with it the tiny triangular bits of scrap outwardly, as is most clearly shown in Fig. 19.

Reverting to Fig. 10, the passages 178 communicate with holes 180 in the die block 130. These holes 180 for the discharge of scrap are elliptical or elongated, as is clearly shown in Fig. 6, and is also shown in Fig. 4. In the latter figure the compressed air supply pipes 182 are shown, these pipes leading from a suitable source to the openings 166.

From consideration of Fig. 6, it will be seen that there are no loose or severed elements between the wire and the endmost element which is being attached to the tape. This will also be clear from inspection of Fig. 17 in which the endmost element 146 is integral with the wire when the wire is being fed to the tape, and is severed from the wire only after being moved against the tape. Thus prior to the severing operation there are no loose elements, and after the severing operation there is only a single severed element, but this is astride the tape and is under the control of the clamping jaws. The latter preferably operate after the severing operation in order to free jaws from the metal of the next succeeding element before attempting to close the jaws. Because of the absence of loose elements there is no need for so shaping the elements as to establish an undercut or interlocking relation therebetween, and instead the outline 158 of the head of the element may take the simple divergent form shown.

If the notches are rounded somewhat, instead of being provided with a sharp point, and if the cutting punch follows the outer wall of the jaws, then small points of metal will be left on the outer ends of the jaws at the places marked 190. However, I consider it slightly preferable to round or dull, rather than point the end of the jaw, and the punch therefore turns outwardly, thus leaving slight projections of metal at the points 190 on the outside of the jaws of the element. This projection of metal is so slight in size that it is readily flattened by the action of the clamping jaws when the elements are being clamped on the tape.

It is believed that the construction and operation of my improved apparatus for severing and attaching fastener elements, as well as the many advantages thereof will be apparent from the foregoing detailed description thereof. Slide fastener wire is fed into the machine, said wire having projections on its upper side and recesses on its lower side and having serrated edges with a residue of fin therealong. The pitch or distance between the projections and recesses is only a small fraction of the length of the elements, the elements being nested together in a substantially scrapless manner, the only scrap being the fin at the serrated edges. The wire is intermittently fed toward the tape by the feed dog. The tape is intermittently moved by the tape feed wheel. The punch bears against the wire immediately around the endmost element, the latter resting on a stationary die surface, so that the punch shears the wire downwardly away from the endmost element. Immediately thereafter the clamping jaws close the jaws of the element on the tape, and the wire feed dog moves back, the wire being held below the dog by the punch.

The pilot on the die insures accurate location of the element relative to the die as it is being cut, and the location is not dependent on the extent of feed by the feed dog. The wire is so operated upon that it is free to self-adjustably seat itself accurately on the pilot, there being no restraint by either punch or the feed dog at the instant of piloting. Triangular bits of scrap may be cut from the side edges of the wire by the same punch and are cleared away from the punch by two divergent compressed air streams. The reciprocating parts of the machine are kept small in stroke and light in weight, thus making possible operation at very high speed.

It will be apparent that while I have shown and described my invention in a preferred form, many changes and modifications may be made without departing from the spirit of the invention as sought to be defined in the following claims.

I claim:

1. Apparatus for the manufacture of slide fasteners, said apparatus comprising a stationary die portion having an external configuration conforming to the shape of the head portion of an element with spread jaws, a pilot projecting upwardly on said die portion and adapted to be received in the recess of an element, a spring pad normally elevated to a position higher than the pilot, a punch over said spring pad having a part mating with the stationary die portion for severing an integral strip of embryo elements from the element overlying said die portion, and heels on said punch for bearing against said spring pad, said heels being of such length as to prevent squeezing of the strip between the punch and the pad, whereby said strip is free for self-adjustable seating on the pilot until the cutting action of the punch begins.

2. Apparatus for the manufacture of slide fasteners, said apparatus comprising a stationary die portion having an external configuration conforming to the shape of the head portion of an element with spread jaws, a pilot projecting upwardly on said die portion and adapted to be received in the recess of an element, a spring pad normally elevated to a position higher than the pilot, a punch over said spring pad having a part mating with the stationary die portion for severing an integral strip of embryo elements from the element overlying said die portion, a feed dog for feeding the strip, and means limiting the downward movement of the feed dog to an intermediate elevation such that said dog is at least partially disengaged from said strip when the punch has forced the strip onto the pilot, said feed dog being pivotally mounted to afford upward movement above said intermediate elevation when the spring pad raises the strip for forward feed above the pilot.

3. Apparatus for the manufacture of slide fasteners, said apparatus comprising a stationary die portion having an external configuration conforming to the shape of the head portion of an element with spread jaws, and having an internal configuration conforming to a beaded tape on which the element is to be attached, a pilot projecting upwardly on said die portion and adapted to be received in the recess of an end element, a spring pad normally elevated to a position higher than the pilot, a punch over said spring pad having a part mating with the stationary die portion for severing an integral strip of embryo elements from an end element overlying said die portion, clamping jaws for clamping the severed element on the beaded edge of the tape, a feed dog for feeding the strip, and means limiting the downward movement of the feed dog to an intermediate elevation such that said dog is at least partially disengaged from said strip when the punch has forced the strip onto the pilot, said feed dog being pivotally mounted to afford upward movement above said intermediate elevation when the spring pad raises the strip for forward feed above the pilot.

4. Apparatus for the manufacture of slide fasteners, said apparatus comprising a stationary die portion having an external configuration conforming to the shape of the head portion of an element with spread jaws, a pilot projecting upwardly on said die portion and adapted to be received in the recess of an element, a spring pad normally elevated to a position higher than the pilot, a punch over said spring pad having a part mating with the stationary die for severing an integral strip of embryo elements from the element overlying said die portion, heels on said punch for bearing against said spring pad and of such length as to prevent squeezing of the strip between the punch and the pad, whereby said strip is free for self-adjustable seating on the pilot until the cutting action of the punch begins, a feed dog for feeding the strip, and means limiting the downward movement of the feed dog to an intermediate elevation such that said dog is at least partially disengaged from said strip when the punch has forced the strip onto the pilot, said feed dog being pivotally mounted to afford upward movement above said intermediate elevation when the spring pad raises the strip for forward feed above the pilot.

5. Apparatus for the manufacture of slide fasteners, said apparatus comprising means to intermittently feed a wire having a series of interlocking means, a single punch movable transversely of the wire to sever the wire from a piece of the wire projecting beyond the punch, the outline of the punch being such as to provide a notching portion and a severing portion so that the projecting piece constitutes a fastener element having a head with spread jaws projecting forwardly therefrom, the head being of such dimension as to fill the space between the jaws, a spring pad beneath the punch to restore the wire to the element previously severed therefrom, the notching portion cooperating with stationary die surfaces beneath the wire at opposite sides of the spring pad for removing small triangular-shaped pieces of scrap metal, air blast means for helping remove the small triangular pieces of scrap, said means including an air inlet, an air and scrap outlet, a first nozzle extending from said inlet to a point above the pieces of scrap at the opposite sides of the punch for blowing the scrap toward the outlet, and a second nozzle extending from said inlet outwardly in the direction of scrap discharge to said outlet.

6. Apparatus for the manufacture of slide fasteners, said apparatus comprising means to intermittently feed a wire having serrated side edges, the serrations of which carry a comparatively thin fin, said wire also having a series of interlocking means, a single punch movable transversely of the wire to sever the wire from a piece of the wire projecting beyond the punch, the outline of the punch being such as to provide a notching portion and a severing portion so that the projecting piece constitutes a fastener element having a head with spread jaws projecting forwardly therefrom, the head being of such dimension as to fill the space between the jaws, a spring pad beneath the punch to restore the wire to the element previously severed therefrom, the notching portion cooperating with stationary die surfaces beneath the wire at opposite sides of the spring pad for removing the triangular-shaped fins or scrap metal, air blast means for helping remove the small triangular pieces of fin or scrap, said means including an air blast, an air and scrap outlet, a first nozzle extending from said inlet to a point above the pieces of scrap at the opposite sides of the punch for blowing the scrap toward the outlet, and a second nozzle extending from said inlet outwardly in the direction of scrap discharge to said outlet.

7. In apparatus for the manufacture of slide fasteners by severing the same from a strip, with the accompanying production of small pieces of scrap or waste at the severing station, an air flow means using compressed air to help insure discharge of the scrap, said means including a compressed air inlet, an air and scrap outlet extending away from the severing station, and a nozzle extending from said inlet outwardly in the direction of scrap discharge and joining said outlet at a point spaced from said severing station, said nozzle blowing air outwardly through the outlet and thereby tending to move the scrap through the outlet.

8. In apparatus including a punch and die for the manufacture of slide fasteners by severing the same from a strip, with the accompanying production of small pieces of scrap or waste, an air flow means using compressed air to help insure discharge of the scrap, said means including a compressed air inlet, an air and scrap outlet extending away from the punch and die, a first nozzle extending from said inlet to a point immediately adjacent the punch and die for agitating and blowing the scrap away from the die, and a second nozzle extending from said inlet outwardly in the direction of scrap discharge to said outlet for blowing air outwardly through the outlet and thereby tending to draw the air from the first nozzle and with it the scrap into the outlet.

9. Apparatus for the manufacture of slide fasteners, said apparatus comprising means to intermittently feed a wire, a single punch and die mechanism to sever the wire, the outline of the punch being such as to provide a notching portion and a severing portion such that the severed piece constitutes a fastener element having a head with spread jaws projecting forwardly therefrom, the head being of such dimension as to fill the space between the jaws, the notching portion acting to remove a triangular-shaped piece of scrap metal at the outside of the embryo jaws, and compressed air blast means for helping transfer the small triangular piece of scrap to an appropriate receptacle, said means including a compressed air inlet, an air and scrap outlet extending away from the punch and die, a first nozzle extending from said inlet to the punch and die for agitating and blowing the scrap away from the die, and a second nozzle extending from said inlet outwardly in the direction of scrap discharge to said outlet for blowing air outwardly through the outlet and thereby tending to draw the air from the first nozzle and with it the scrap into the outlet.

10. Apparatus for the manufacture of shaped units from a strip, said apparatus comprising means to intermittently feed the strip, a punch and die mechanism to sever the strip into units of desired outline with the formation of small pieces of scrap, and compressed air nozzle means for helping remove the small pieces of scrap, said means comprising generally horizontally disposed members extending over the die to the sides of the punch and closely fitting the sides of the punch, a generally horizontal air inlet through each member, an outlet beneath said inlet, a source of compressed air connected to each inlet, a nozzle at the inner end of each inlet directed inwardly and downwardly toward the cutting station, and a second nozzle passing downwardly through each member from the inlet to the outlet, said second nozzle extending diagonally outward to the outlet, whereby the first nozzle serves to agitate and blow the scrap away from the punch and die, while the second nozzle tends to blow the scrap outwardly.

FREDERICK ULRICH.